United States Patent
Womble et al.

[15] 3,635,506
[45] Jan. 18, 1972

[54] CLAMP FOR COUPLING PIPES

[72] Inventors: George E. Womble; James L. Suhr, both of Kewanee, Ill.

[73] Assignee: Kewanee Machinery & Conveyor Co., Kewanee, Ill.

[22] Filed: Feb. 17, 1970

[21] Appl. No.: 12,029

[52] U.S. Cl. ............................................. 285/411, 24/284
[51] Int. Cl. ............................................................ F16l 23/00
[58] Field of Search ................... 285/411, 410, 367; 24/284, 24/279, 285, 270, 19

[56] References Cited

UNITED STATES PATENTS 2,717,788  9/1955  Raynes .................................. 285/411

FOREIGN PATENTS OR APPLICATIONS 370,604  8/1963  Switzerland .......................... 285/410

Primary Examiner—Thomas F. Callaghan
Attorney—Johnson, Dienner, Emrich, Verbeck & Wagner

[57] ABSTRACT

A clamp for coupling together two abutting end flanges of two pipes comprising a joint band fastened about the periphery of the two flanges by a tightening device. The joint band has two semicircular band segments that are identical in construction and mate together.

Each band segment has a corrugated configuration consisting of an alternate series of ridges and grooves between its outturned ends. In each groove is symmetrically formed a double-keyhole slot having a curved middle portion and two diverging straight end portions. The straight end portions have parallel sides which are spaced apart a distance slightly greater than the combined thickness of the flanges to provide a snug fit thereon.

The tightening device comprising two fastener means which tighten together the mating ends of the band segments after they have been snugly fitted over the outer edges of the two flanges.

5 Claims, 5 Drawing Figures

PATENTED JAN 18 1972
3,635,506
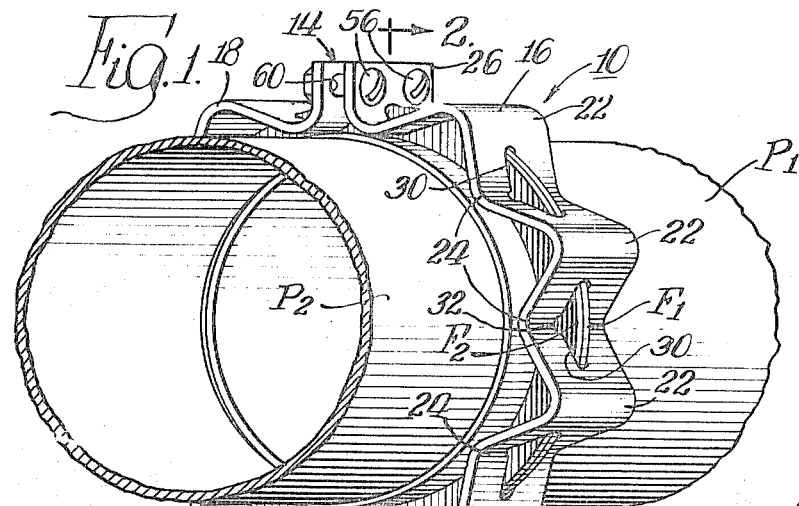
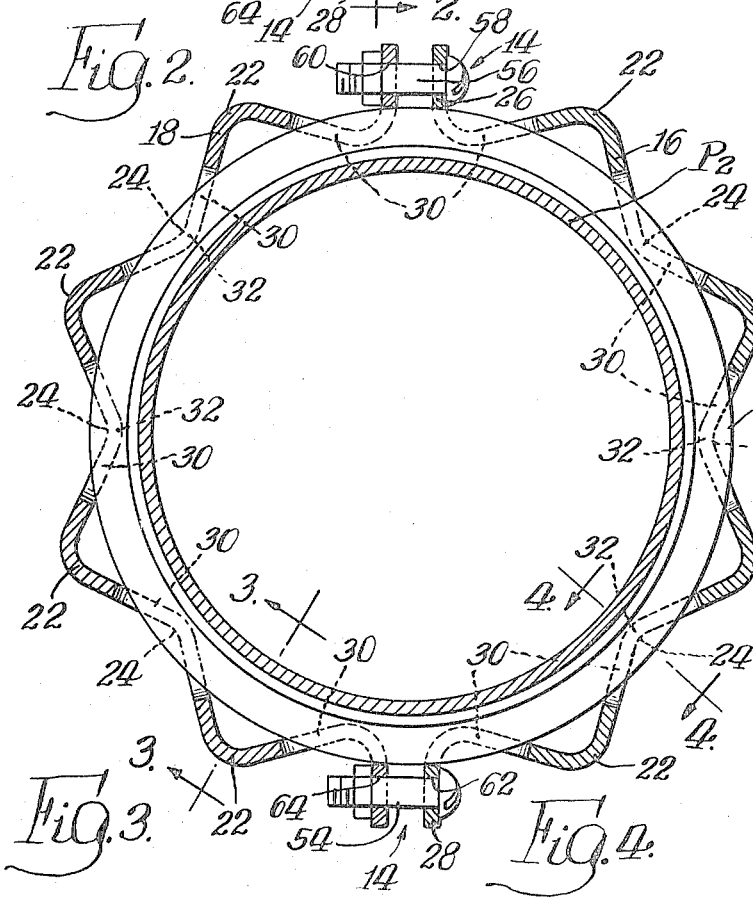
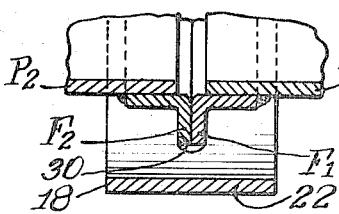
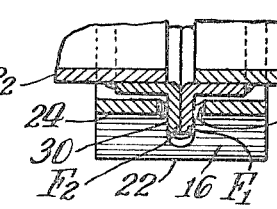
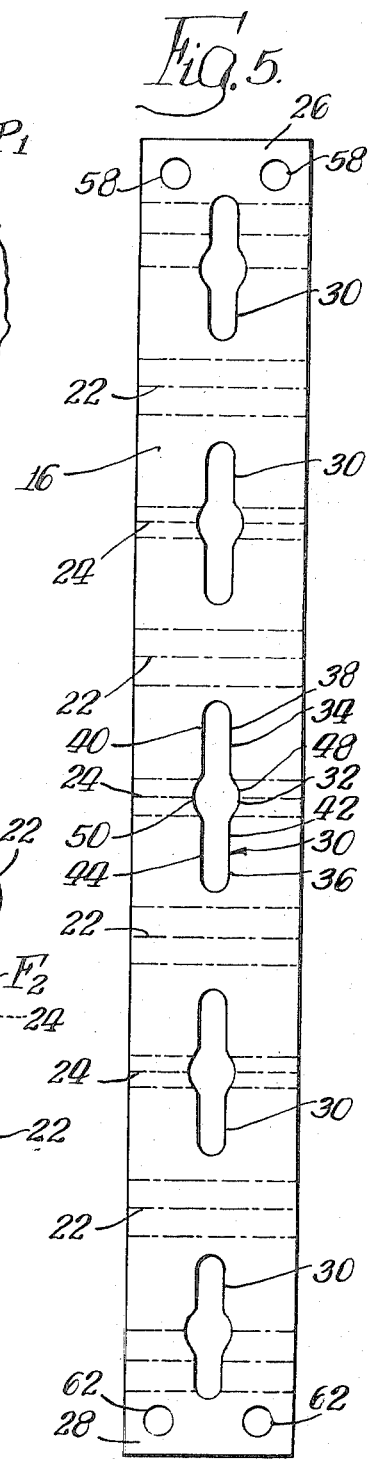
Inventors:-
George E. Womble,
James L. Suhr,
By Johnson Dienner Emrich
Verbeck & Wagner
Attys.

CLAMP FOR COUPLING PIPES

BACKGROUND OF THE INVENTION

This invention relates to a clamp, and more particularly a band-type clamp, for securing together the end flanges of two pipes.

The band-type of clamp is generally constructed by joining together two or more arcuate segments about the outer edges of the flanges. Each of these arcuate segments have a corrugated configuration with elongated slots symmetrically formed in each of the grooves of the corrugations. The opposite sides of these slots fit over the outside surfaces of the flanges to contain the flanges therebetween.

The particular shape of these slots has been found to be a significant design factor in order to hold the flanges together in a tight locking engagement. One problem is that the sides of some slot shapes tend to close together when mounting the clamp on the flanges.

By virtue of the slot configuration of this invention, the opposite sides of each slot easily and snugly fit along the outside surfaces of the abutting flanges to provide a locktight engagement.

BRIEF DESCRIPTION OF DRAWINGS

For a better understanding of this invention, reference is made to the drawings in which:

FIG. 1 is a front perspective view showing the embodiment of this invention coupling together the circular flanges on the ends of two opposing pipes;

FIG. 2 is a cross-sectional view taken along the line 2—2 of FIG. 1 and looking in the direction of the arrows;

FIG. 3 is a cross-sectional view taken along the line 3—3 of FIG. 2 and looking in the direction of the arrows;

FIG. 4 is a cross-sectional view taken along the line 4—4 of FIG. 2 and looking in the direction of the arrows; and FIG. 5 is a stretched out view of one of the joint band segments which is formed in a corrugated configuration along the dotted lines as illustrated in FIGS. 1 and 2.

DESCRIPTION OF PREFERRED EMBODIMENT

Referring to FIGS. 1 and 2, there is shown the preferred embodiment of this invention clamping together the ends of two pipe sections P1 and P2. As is common practice, the pipe sections P1, P2 have mating circular flanges F1 and F2, respectively, which are placed in abutting relation prior to applying the clamp 10 of this invention.

Clamp 10 includes a joint band 12 which is adapted to be disposed around the periphery of flanges F1, F2 and to hold the two flanges F1, F2 in abutting relation by means of a tightening device 14.

The joint band 12 comprises two semicircular band segments 16 and 18, which are identical in shape and construction. The band segments 16, 18 are formed from a long strip of material, as represented in FIG. 5 having high strength characteristics but being sufficiently pliable, for example rolled steel, to form the corrugation configuration. The long strip of material shown in FIG. 5 is formed into the semicircular band segments 16, 18 by bending the strip along the dotted cross-lines into a corrugation configuration having alternate ridges 22 and grooves 24 and by bending its opposite ends 26, 28 radially outwardly.

The flanges F1, F2 are held together in locking engagement by means of a series of elongated slots 30 which are formed symmetrically about each groove 24 of band segments 16, 18. The elongated slot 30 has a double-keyhole slot configuration comprising a curved middle portion 32 and a pair of diverging straight end portions 34, 36.

The end portions 34 and 36 of elongated slot 30 have substantially parallel sides 38, 40 and 42, 44, respectively, and these parallel sides are spaced apart from each other by a distance slightly greater than the combined thickness of the flanges F1, F2. Consequently, when the band segments 16, 18 are disposed about the flanges F1, F2, the pairs of sides 38—40 and 42—44 are in frictional engagement with the opposite surfaces of F1–F2.

The curved middle portion 32 of each elongated slot 30 have a pair of arcuate sides 48 and 50 which curve outwardly causing the middle portion 32 to be greater in width throughout its length than the width of the end portions 36, 38. By making the middle portion 32 to have a larger width than the end portions 36, 38, it prevents the sides of the elongated slot 30 from tending to close together as the joint band segments 16, 18 are placed over the edges of flanges F1, F2.

The tightening device 14 comprises two sets of clamp bolts 54 and 56 which are threaded through the aligned openings 58, 60 and 62, 64, respectively in band segments 16 and 18.

To clamp the pipes P1, P2 together, their flanges F1, F2 are placed in abutting relation and the two band segments 16, 18 are snugly fitted over the flanges F1, F2 until the ends of the straight end portions 34, 36 of slot 30 are engaged, in a manner shown in FIG. 1. Finally, the two sets of clamp bolts 54 and 56 are inserted through the aligned openings 58, 60 and 62, 64, respectively, and tightened to provide a locking engagement.

From the foregoing description, it will be appreciated that the double-keyhole slot configuration accomplishes two important functions. By having the middle portion 32 wider than the two end portions 36 and 38, there is no tendency of the sides of the prepunched hole to close together permitting the band segments 16 and 18 to be easily installed. By having the sides of the end portions 36 and 38 parallel, these parallel sides slide onto the flanges to provide a consistent tight fit.

We claim:

1. A clamp for joining together two pipes having mating circular flanges on their opposing ends which are arranged in an abutting relation, comprising a joint band having a series of alternate ridges and grooves along its length and a series of elongated slots formed lengthwise in the walls of said band, each of said slots defining a curved middle portion formed in said grooves and a pair of diverging straight end portions, where the sides of said straight end portions are substantially parallel and spaced apart a distance slightly greater than the combined thickness of the mating flanges and where the sides of the curved portion are spaced apart a greater distance than the distance between the sides of said straight end portions, and tightening means for withdrawing said joint band radially inwardly.

2. A clamp as defined in claim 1, wherein said joint band comprises at least two arcuate segments.

3. A clamp as defined in claim 1, wherein each of said elongated slots defines a double-keyhole shape configuration symmetrically located with respect to each of said grooves.

4. A clamp for joining together two pipes having mating circular flanges on their opposing ends which are arranged in an abutting relation, comprising a pair of semicircular joint band segments, each of said band segments having a series of alternate ridges and grooves along its length between its radial outturned ends and having a series of elongated slots formed lengthwise in the walls of said segments, each of said slots defining a curved middle portion formed in said grooves and a pair of diverging straight end portions, where the sides of said straight end portions are substantially parallel and spaced apart a distance slightly greater than the combined thickness of the mating flanges and where the sides of said curved portion are spaced apart a greater distance than the distance between the sides of said straight end portions, and clamp means for securing together said outturned ends of said pair of band segments.

5. A clamp as defined in claim 4, wherein each of said elongated slots defines a double-keyhole shape configuration symmetrically located with respect to each of said grooves.

* * * * *